(12) United States Patent
Kinsala

(10) Patent No.: US 10,759,587 B2
(45) Date of Patent: Sep. 1, 2020

(54) SHIPPING ENVELOPE

(71) Applicant: Robby Kinsala, Waxahachie, TX (US)

(72) Inventor: Robby Kinsala, Waxahachie, TX (US)

( * ) Notice: Subject to any disclaimer, the term of this patent is extended or adjusted under 35 U.S.C. 154(b) by 0 days.

(21) Appl. No.: 16/404,812

(22) Filed: May 7, 2019

(65) Prior Publication Data

US 2019/0344949 A1   Nov. 14, 2019

Related U.S. Application Data

(60) Provisional application No. 62/668,492, filed on May 8, 2018.

(51) Int. Cl.
*B65D 81/18* (2006.01)
*B65D 27/16* (2006.01)
*B65D 85/84* (2006.01)

(52) U.S. Cl.
CPC ............ *B65D 81/18* (2013.01); *B65D 27/16* (2013.01); *B65D 85/84* (2013.01); *B65D 2585/88* (2013.01)

(58) Field of Classification Search
CPC ........ B65D 81/18; B65D 27/16; B65D 85/84; B65D 2585/88
USPC ........................................... 229/68.1
See application file for complete search history.

(56) References Cited

U.S. PATENT DOCUMENTS

| 2,578,107 | A | | 12/1951 | Thacker | |
|---|---|---|---|---|---|
| 2,779,527 | A | | 1/1957 | Fallert | |
| 3,066,847 | A | * | 12/1962 | Fortune | B65D 81/3897 206/524.1 |
| 3,082,713 | A | * | 3/1963 | Elgin | A45C 3/00 109/82 |
| 3,637,000 | A | * | 1/1972 | Walger | A45C 13/00 383/61.3 |
| 5,160,025 | A | | 11/1992 | Greenawald | |
| 5,372,429 | A | | 12/1994 | Beaver | |
| 5,913,607 | A | * | 6/1999 | Lengyel, Sr. | A45C 13/00 383/110 |
| 6,595,383 | B2 | | 7/2003 | Pietrantoni | |
| 9,932,764 | B2 | * | 4/2018 | Mcmurray | E05G 1/005 |
| 10,183,781 | B2 | * | 1/2019 | Parque | B65D 27/20 |
| 2002/0056713 | A1 | * | 5/2002 | Rose | B32B 15/04 220/62.11 |
| 2003/0082445 | A1 | | 5/2003 | Smith | |
| 2005/0161353 | A1 | * | 7/2005 | Devine | A45D 1/00 206/320 |
| 2009/0190865 | A1 | * | 7/2009 | Chang | A45C 11/16 383/110 |

(Continued)

*Primary Examiner* — Jes F Pascua
(74) *Attorney, Agent, or Firm* — Decker Jones PC; Brian K. Yost

(57) ABSTRACT

An envelope generally comprises a sandwich of layers comprising an outer layer, outer plastic film layers affixed to the outer layer, a ceramic fiber layer, a radiant barrier layer, and one or more plastic film layers affixed to an obverse or reverse side of the radiant barrier layer. The sandwich of layers is folded over unto itself at the bottom and sealed at the sides so as to form an envelope, and the top closure being formed by folding the top downward over the folded lower portion. In other embodiments, the sandwich of layers comprises an outer radiant barrier layer and an inner radiant barrier layer, first, second, and third plastic film layers, and a ceramic fiber layer. In some embodiments, the envelope comprises a mesh layer.

17 Claims, 5 Drawing Sheets

(56) References Cited

U.S. PATENT DOCUMENTS

| | | | |
|---|---|---|---|
| 2010/0027920 A1* | 2/2010 | Raidl | B32B 9/025 |
| | | | 383/42 |
| 2012/0111869 A1 | 5/2012 | Green | |
| 2014/0054196 A1 | 2/2014 | Schaefer | |
| 2017/0314835 A1 | 11/2017 | Howland | |
| 2020/0001125 A1* | 1/2020 | Vandemark | A62C 2/06 |

* cited by examiner

SHIPPING ENVELOPE

This application claims the benefit of provisional application Ser. No. 62/668,492 filed May 8, 2018, the contents of which is incorporated by reference herein in its entirety.

BACKGROUND OF THE INVENTION

1. Field of the Invention

The present invention relates generally to a shipping envelope and specifically to a shipping envelope for shipping combustible and potentially explosive materials.

2. Background of the Invention

Rechargeable batteries such as Lithium-ion batteries are increasingly used in many consumer and industrial products such as mobile phones, laptop computers, digital cameras, hoverboards, electronic cigarettes, power tools, lawn and garden equipment, electric vehicles and many others. Unfortunately, batteries occasionally fail, sometimes violently. For example, the company Samsung issued a global recall of its Galaxy Note 7® smartphone in October 2016 as a result of some of these phones overheating and catching fire. Similarly, in 2017, The Consumer Product Safety Commission recalled approximately 16,000 hoverboards from various manufacturers due to concerns that the products could catch fire or explode.

When recalls, such as those described above, occur, product owners are routinely advised to return the product to the manufacturer for replacement. It is often desirable to ship the potentially defective product via a public or private package delivery company. Because such items are potentially dangerous, regulators and transportation companies require that the packaging for these products meets or exceeds certain flame penetration resistance, thermal protection and integrity standards.

Although this disclosure is primarily directed to the protection of shipments of batteries, it is not limited to the protection of shipments of batteries. Rather, this disclosure is applicable to packaging for products containing chemicals that may undesirably react or actuate as may occur, for example, spontaneously, mechanically, or as a result of fire or high temperature conditions. Various safety precautions are taken to prevent undesirable reaction and/or actuation of a product or chemical during shipment.

The shipping envelope of the present invention comprises a flexible and lightweight sandwich of protective layers structured and arranged to permit combustible and potentially explosive materials such as batteries to be safely shipped via conventional transportation channels.

3. Description of the Prior Art

A number of patents and patent publications teach shipping containers for hazardous materials. For example, Green, U.S. Pat. App. No. 2012/0111869, discloses a flame-resistant packaging system comprising a flame and heat resistant liner inside a box.

U.S. Pat. No. 6,595,383 to Pietrantoni provides rigid packaging comprising a thermal barrier for shipping compressed gas cylinders.

Greenawald, U.S. Pat. No. 5,160,025, discloses a rigid battery shipping container comprising a foam absorbent liner, felt blankets, and zip lock bags.

U.S. Pat. Nos. 2,779,527, and 2,578,107, to Fallert and Thacker and Smith, U.S. Pat. App. No. 2003/0082445, disclose battery containers. The Fallert and Thacker containers are rigid containers intended for use in shipping. The Smith container is not a shipping container.

Beaver, U.S. Pat. No. 5,372,429, provides a pouch comprising outer and inner bags, the outer bag having an absorbent material and cushioning material. The pouch may be inserted within a rigid fiberboard container.

U.S. Pat. App. No. 2017/0314835, Howland provides a high temperature shipping container comprising outer walls and an inner chamber fabricated from rigid material.

Schaefer, U.S. Pat. App. No. 2014/0054196, provides a rigid transportation container for batteries and other hazardous material, the container comprising a receptacle and an extinguishing agent.

U.S. Pat. No. 6,145,686, Stinson provides a rigid fume, fire, and flash explosion containment apparatus.

However, there remains a need for an economical, lightweight, flexible, shipping envelope structured and arranged to permit combustible and potentially explosive materials such as batteries to be safely shipped via conventional package delivery networks and infrastructure.

SUMMARY OF THE INVENTION

The present disclosure provides an economical lightweight shipping envelope structured and arranged to permit combustible and potentially explosive materials such as batteries to be safely shipped via conventional shipping channels. The shipping envelope comprises a sandwich of layers comprising an outer layer, a plastic film layer affixed to the outer layer, a ceramic fiber layer, a radiant barrier layer, and a non-conductive, impermeable plastic film layer affixed to the radiant barrier layer. The sandwich of layers is folded over unto itself at the bottom and sealed at the sides so as to form an envelope, and the top closure being formed by folding the top downward over the folded lower portion.

In the preferred embodiment, the outer layer is a kraft paper layer preferably having a high tensile strength such as kraft paper. Affixed to the outer layer is the plastic film layer. The plastic film layer is preferably formed from materials that are flexible, puncture and chemical resistant, flame retardant, and with good water vapor barrier properties. In the preferred embodiment, the plastic film layer is formed from low-density polyethylene (LDPE) and cast polypropylene (CPP).

The ceramic fiber layer of the preferred embodiment comprises materials adapted to withstand high temperatures. Preferably, the ceramic fiber layer is relatively tear resistant and able to withstand high temperatures. In the preferred embodiment, the ceramic fiber layer is a bio soluble woven material formed from a blend of calcium, silica, and magnesium. In other embodiments, the ceramic fiber layer is formed from a light weight refractory ceramic fiber (RCF). In some embodiments, the ceramic fiber layer is formed from alumino-silicate fibers that exhibit high temperature stability. In some embodiments, ceramic fiber layer 18 is formed from material commercially sold under the brand name Fiberfrax®.

In some embodiments of the present invention, a mesh layer is positioned adjacent to the ceramic fiber layer. In such embodiments, the mesh layer is formed from a high tensile strength, heat resistant, woven mesh material.

The radiant barrier layer comprises a metallic material such as aluminum. In the preferred embodiment, the radiant barrier layer comprises metalized film. Preferably, both the obverse and revers sides of the radiant barrier are coated with the plastic film layer. This plastic film layer is formed from materials which are generally non-conductive and relatively impermeable to moisture. In the preferred embodiment, plastic film layer comprises LDPE film.

In forming the sandwich of layers of preferred embodiments, each layer comprises a generally rectangular configuration conforming to the desired size of the shipping envelope. The ceramic fiber layer and mesh layer, if any, are cut to a smaller size so as to permit the seams to be joined together tightly and such that the fiber layer and mesh layer are not made part of the seams.

The stacked layers are folded over at the bottom such that the obverse face of a portion of the radiant barrier faces the obverse face of another portion of the radiant barrier. In such folded position, the outer layer is on both the front and back side of the shipping envelope.

In the folded position, a fold is formed at a lower portion of the shipping envelope and a top closure portion remains. This top closure portion comprises a single sandwich of layers rather than the double sandwich of layers formed where the layers overlap.

The closure portion of the preferred embodiment comprises an adhesive strip. A removable adhesive strip cover covers the adhesive strip until the adhesive strip is ready to be used to close the shipping envelope.

The seams of the preferred embodiment are formed by heat welding. When the seams are so welded, an enclosure is formed into which hazardous materials such as batteries may be placed for shipment. The seams may be formed in other ways such as crimping, gluing, or other fastening techniques.

The closure portion is adapted to be folded over the front surface of the shipping envelope. With the adhesive strip cover removed from the adhesive strip, the closure portion adheres to the front surface of the shipping envelope when the adhesive strip is pressed against the front surface of the shipping envelope. In this configuration, the shipping envelope, together with its contents, is ready for shipment.

DESCRIPTION OF THE PREFERRED EMBODIMENT

Figure 1:
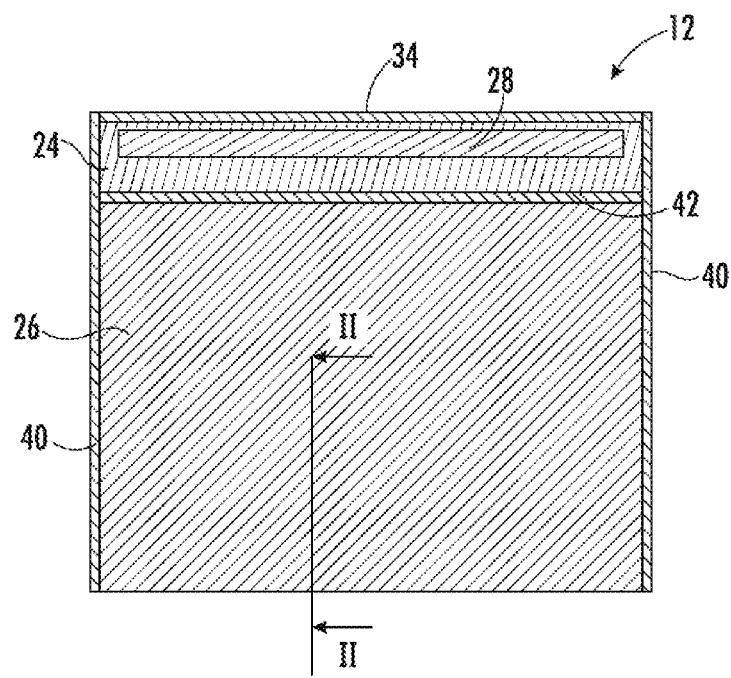
FIG. 1 is a front elevation view of the shipping envelope in accordance with a preferred embodiment.

A preferred embodiment of the envelope 12 is presented in the figures referenced above. In describing the embodiments of the invention, specific terminology will be used for the sake of clarity. However, the invention is not intended to be limited to the specific terms so selected, it being understood that each specific term includes all technical equivalents operating in a similar manner to accomplish a similar purpose. It is understood that the drawings are not drawn exactly to scale. Some drawings are presented to provide a conceptual overview of the invention or components thereof, and not for establishing or depicting the relative size of invention components. In the drawings, similar reference numbers are used for designating similar elements throughout the several drawings.

This specification and appended claims describe particular embodiments of the invention. However, it should be understood, based on this disclosure, that the invention is not limited to the embodiments detailed herein. As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment of the present disclosure. Thus, the appearances of such phrases in various places throughout this specification are not necessarily all referring to the same embodiment. Furthermore, the particular features, structures, or characteristics may be combined in any suitable manner on one or more embodiments without limitation. The detailed description illustrates by way of example, not by way of limitation, the principles of the invention. This description will clearly enable one skilled in the art to make and use the invention, and describes several embodiments, aspects, adaptations, variations, alternatives, and uses of the invention, including what is presently believed to be the best mode of carrying out the invention.

The examples and illustrations of a shipping envelope are described herein with respect to shipping certain objects and materials. However, the invention is equally applicable for use with other materials and for shipping other objects. Moreover, while certain materials are discussed herein with respect to various components of the various embodiments, the embodiments are not limited to such materials. For example, in a preferred embodiment, certain components are formed from low-density polyethylene (LDPE) and cast polypropylene (CPP). However, as will be discussed in more detail below, the components of the shipping envelope may comprise any suitable materials without departing from the scope and spirit of this disclosure.

Referring to FIGS. 1-6, in a preferred embodiment of the present invention, the envelope 12 generally comprises a sandwich of layers comprising an outer layer 14, outer plastic film layers 16 affixed to the paper layer 14, a ceramic fiber layer 18, a radiant barrier layer 20, and one or more plastic film layers 22 affixed to an obverse or reverse side of the radiant barrier layer 20, The sandwich of layers 14-22 is folded over unto itself at the bottom and sealed at the sides so as to form an envelope 12, and the top closure 24 being formed by folding the top downward over the folded lower portion 26.

Figure 2:
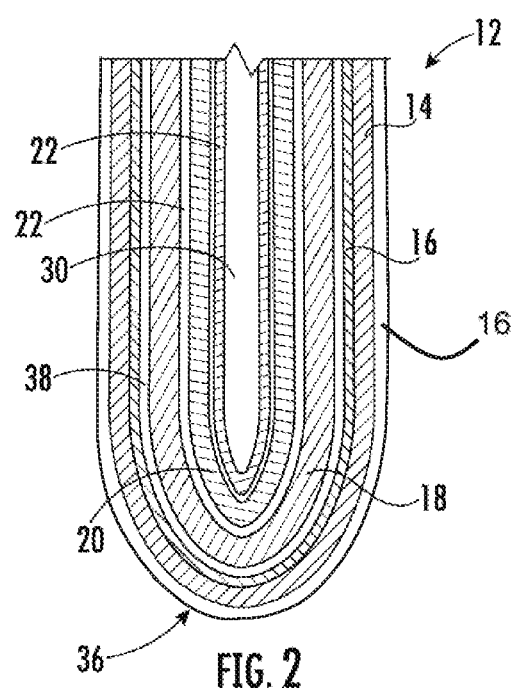
FIG. 2 is a conceptual, not to scale, sectional view of the shipping envelope along the line II-II of FIG. 1.
Figure 3:
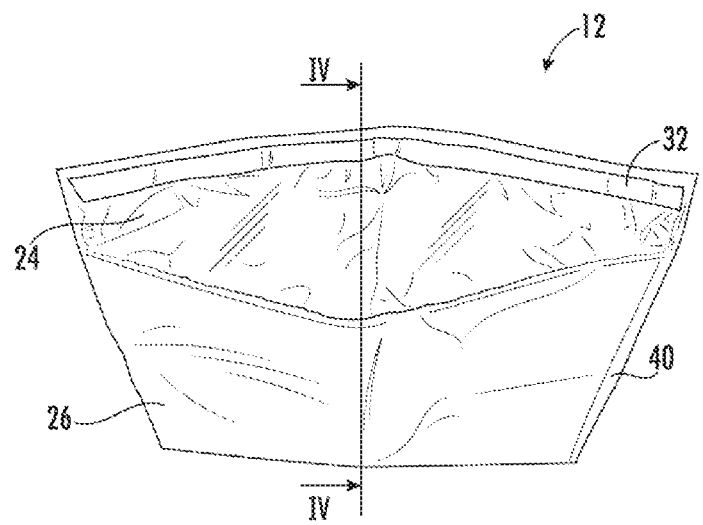
FIG. 3 is a top and front side isometric view of the shipping envelope in accordance with a preferred embodiment.
Figure 4:
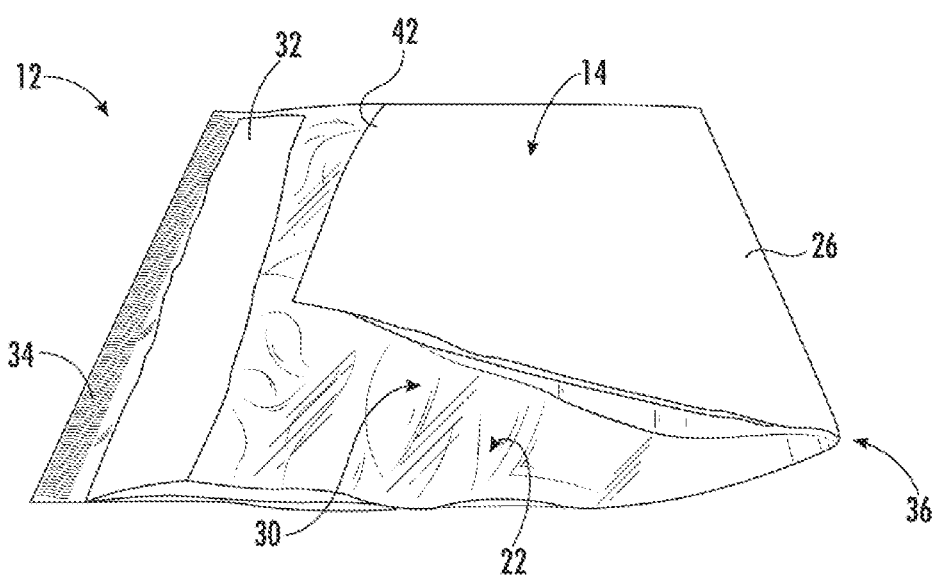
FIG. 4 is a sectional view of the shipping envelope along the line IV-IV of FIG. 3.
Figure 5:
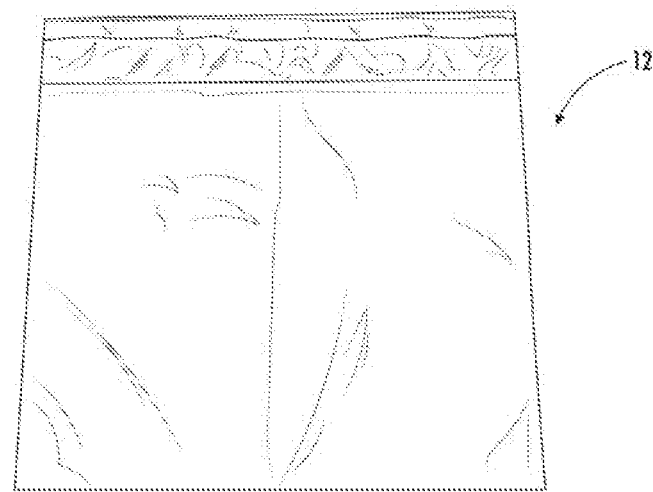
FIG. 5 is a front elevation view of the shipping envelope in accordance with a preferred embodiment.
Figure 6:
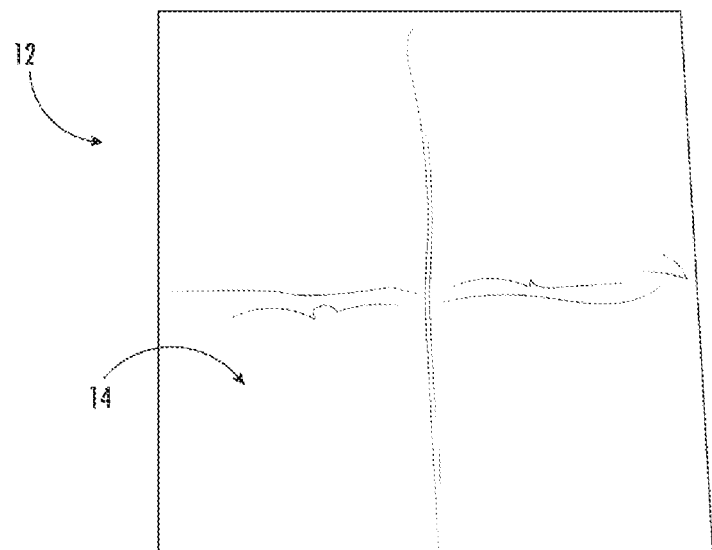
FIG. 6 is a rear elevation view of the shipping envelope of FIG. 5.
Figure 7:
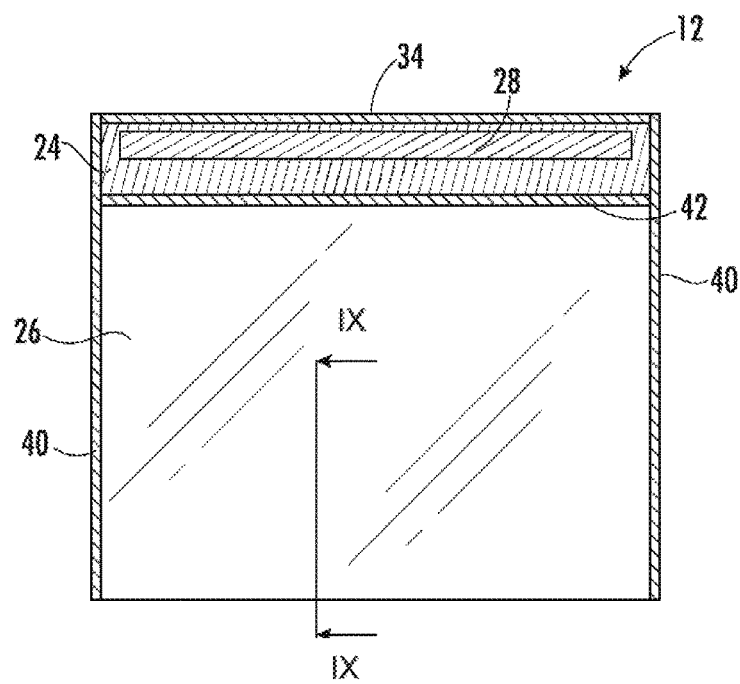
FIG. 7 is a front elevation view of a shipping envelope in accordance with another embodiment.
Figure 8:
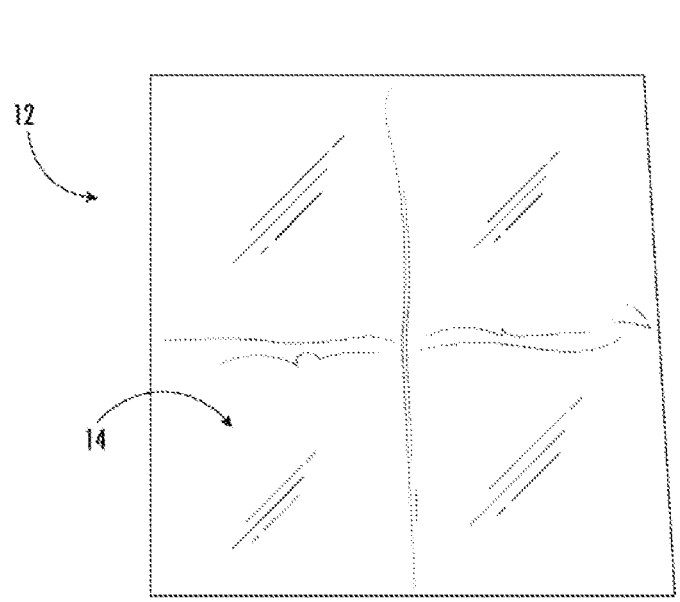
FIG. 8 is a rear elevation view of the shipping envelope of FIG. 7.

In the embodiment shown in FIGS. 1-6, the outer layer 14 is a paper layer preferably having a high tensile strength such as kraft paper or aluminum paper. Affixed to the outer layer 14 is the plastic film layer 16. The plastic film layer 16 may be affixed to one or both sides (as shown in FIG. 2) of the outer layer 14. The plastic film layer 16 is preferably formed from materials that are flexible, puncture and chemical resistant, flame retardant, and with good water vapor barrier properties. In the preferred embodiment, the plastic film layer 16 is formed from two sub-layers. The first sub-layer is formed from low-density polyethylene (LDPE). The second sub-layer is formed from cast polypropylene (CPP).

In another embodiment, as shown in FIGS. 7-11, the envelope 12 comprises a sandwich of layers comprising an outer radiant barrier layer 20, outer plastic film layers 16 affixed to one or both sides of the outer radiant layer 20, a ceramic fiber layer 18, an inner radiant barrier layer 20, and one or more plastic film layers 22 affixed to an obverse or reverse side of the inner radiant barrier layer 20, The sandwich of layers 16-22 is folded over unto itself at the bottom and sealed at the sides so as to form the envelope 12, and the top closure 24 being formed by folding the top downward over the folded lower portion 26. In such embodiments, there is no paper layer 14.

The ceramic fiber layer 18 of preferred embodiments comprises materials adapted to withstand high temperatures. Preferably, the ceramic fiber layer 18 is relatively tear resistant and able to withstand continuous temperatures up to 1260 C. In the preferred embodiment, the ceramic fiber layer 18 is a ⅛" thick bio soluble woven material formed from a blend of calcium, silica, and magnesium. In other embodiments, the ceramic fiber layer 18 ranges in thickness from ¹⁄₁₆" to ⁵⁄₃₂". In other embodiments, the ceramic fiber layer 18 is formed from a light weight refractory ceramic fiber (RCF) having properties consistent with low thermal conductivity; low heat storage, good thermal shock resistance, and corrosion resistance. In such embodiments, the ceramic fiber layer 18 is formed from alumina-silicate fibers that exhibit high temperature stability for continuous use at temperatures up to 1430° C. In some embodiments, ceramic fiber layer 18 is formed from material commercially sold under the brand name Fiberfrax®.

Figure 9:
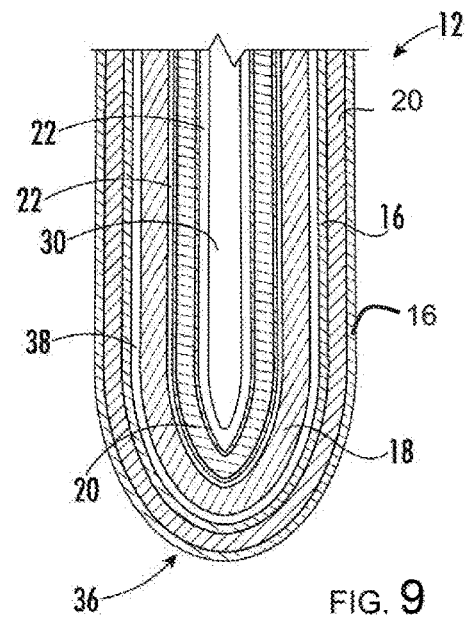
FIG. 9 is a conceptual, not to scale, sectional view of the shipping envelope of FIG. 7 along the line IX-IX of FIG. 7.
Figure 10:
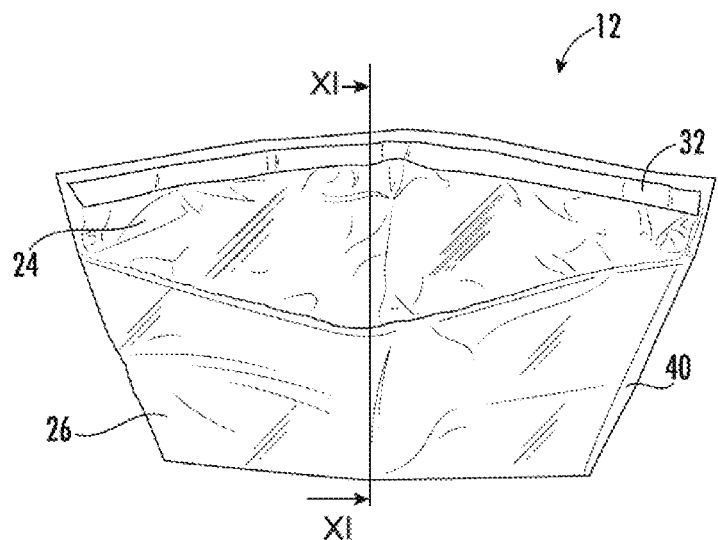
FIG. 10 is a top and front side isometric view of the shipping envelope of FIG. 7.
Figure 11:
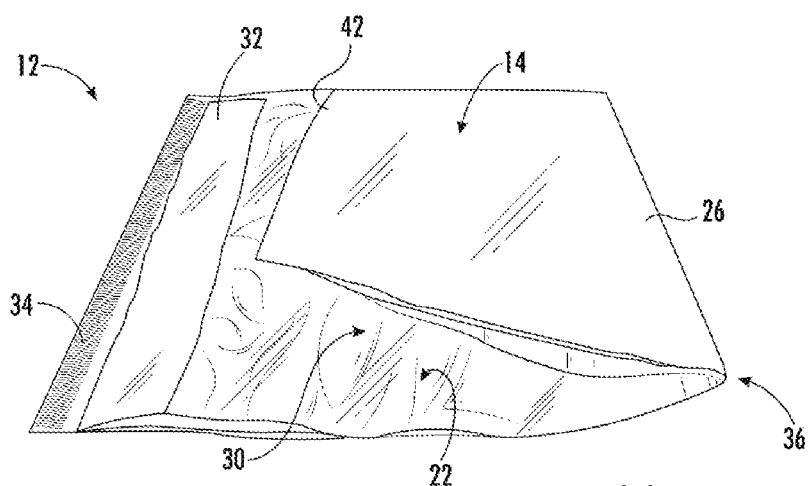
FIG. 11 is a sectional view of the shipping envelope of FIG. 10, along the line XI-XI of FIG. 10.

In some embodiments of the present invention, a mesh layer 38 is positioned adjacent to the ceramic fiber layer 18. Though FIGS. 2 and 9 illustrate embodiments comprising a mesh layer, in other embodiments, the envelope 12 does not contain a mesh layer 18. In embodiments comprising a mesh layer 38, the mesh layer 38 is formed from a high tensile strength, heat resistant, woven mesh material such as fiberglass. In the preferred embodiment, the mesh layer 18 is approximately 0.012 inches in thickness. The following table details technical information related to the mesh layer 38:

| TECHNICAL INFORMATION PRODUCT: FIBERGLASS 18 × 16 11 MIL YARN, PLAIN WEAVE | | | |
|---|---|---|---|
| CHARACTERISTICS | REFERENCE TEST METHOD | NOMINAL RESULTS | |
| | | WARP | FILL |
| 1) TENSILE STRENGTH | | | |
| A) CUT STRIP METHOD (lb) | ASTM D 5035 | 106 | 92 |
| B) GRAB METHOD (lb) | ASTM D 5034 | 107 | 91 |
| 2) TEARING STRENGTH | | | |
| TRAPEZOID METHOD (lb) | ASTM D 5587 | 12 | 11 |
| 3) YARN SLIPPAGE (lb) | ASTM D 4912 | 24 | 24 |
| 4) STIFFNESS (mg) | ASTM D 3656 | 83 | 73 |
| 5) MESH WEIGHT (oz/sq yd) | ASTM D 3776 | 3.2 | |
| 6) FABRIC THICKNESS (inch) | ASTM D 1777 | 0.012 | |
| 7) BOND STRENGTH (lb) | CS 248-84 (5.5) | 28 | |
| 8) OPENNESS/TRANSMITTANCE (%) | I7 | 59.4 | |
| 9) BLOCKING | FS L-S-125B (4.4.9) | Scale 1 | |
| 10) COLORFASTNESS TO 1200 HRS Color Change According to AATCC Gray Scale | TMS-TM-003 | All Colors 4 min | |
| 11) MULLEN BURSTING STRENGTH (pai) | FS L-S-125B (4.4.7) | | |
| A) Initial | | 121 | |

The radiant barrier layer 20 comprises a metallic material such as aluminum. In preferred embodiments, the radiant barrier layer 20 comprises metalized film. This radiant barrier layer 20 is coated on one or both sides (obverse and reverse) with a plastic film layer 16, 22 formed from materials that are generally non-conductive and relatively impermeable to moisture. In the preferred embodiment, plastic film layer 16, 22 comprises LOPE film, Preferably, both the obverse and revers sides of the radiant barrier 20 are coated with the plastic film layer 22.

In forming the sandwich of layers 14-22, 38 of preferred embodiments (16-22, 38 in some embodiments not comprising a paper layer 14), each layer 14-22, 38 comprises a rectangular configuration conforming with the desired size of the shipping envelope 12. The ceramic fiber layer 18 and mesh layer 38 (in embodiments comprising the mesh layer 38) are cut to a smaller size so as to permit the top seam 34, side seams 40, and mid seam 42 to be joined together tightly and such that the fiber layer 18 and mesh layer 38 are not made part of the seams 34, 40, 42. Although the layers 14-22, 38 of preferred embodiments are rectangular in configuration, the layers 14-22, 38 need not be rectangular. Rather, the layers 14-22, 38 and shipping envelope 12 may be configured in virtually any geometric shape that permits the contents within an enclosure 30 of the envelope 12 to be shielded.

The layers 14-22, 38 (16-22, 38) are stacked together as described, and the stacked layers 14-22, 38 are folded over at the bottom such that the obverse face of a portion of the radiant barrier 20 faces the obverse face of another portion of the radiant barrier 20. In the embodiment shown in FIGS. 1-6, with such folded position, the outer layer 14 may be seen on both the front (FIG. 5) and back side (FIG. 6) of the shipping envelope 12. In the embodiment shown in FIGS. 7-11, with such folded position, the radiant barrier 20 may be seen on both the front (FIG. 5) and back side (FIG. 6) of the shipping envelope 12.

In the folded position, a fold 36 is formed at a lower portion of the shipping envelope 12 and a top closure portion 24 remains. This top closure portion 24 comprises a single sandwich of layers 1422, 38 (16-22,38) rather than the double sandwich of layers 14-22, 38 (16-22,38) formed where the layers 14-22, 38 (16-22,38) overlap. The closure portion 24 of the preferred embodiment comprises an adhesive strip 28. In such embodiment, the adhesive strip 28 comprises conventional and commercially available pressure sensitive double-sided tape. A removable adhesive strip cover 32 covers the adhesive strip 28 until the adhesive strip 28 is used to close the shipping envelope 12. This adhesive strip cover 32 is formed from paper or some other suitable material well known in the art.

The seams 34, 40, 42 of the preferred embodiment are formed by heat welding. A conventional heat welding machine is used with a temperature setting of approximately 300 C degrees. Pressure and heat are applied to each seam 34, 40, 42 for approximately two to three seconds per seam edge 34, 40, 42. When the seams 34, 40, 42 are so welded, the enclosure 30 is formed into which hazardous materials such as batteries may be placed for shipment. Although the seams 34, 40, 42 of the preferred embodiment are formed by heat welding, the seams 34, 40, 42 may be formed in other ways such as crimping, gluing, or other fastening techniques.

The closure portion 24 is adapted to be folded over the front surface of the shipping envelope 12. With the adhesive strip cover 32 removed from the adhesive strip 28, the closure portion 24 adheres to the front surface of the shipping envelope 12 when the adhesive strip 28 is pressed against the front surface of the shipping envelope 12. In this configuration, the shipping envelope 12, together with its contents, is sealed and ready for shipment.

The foregoing disclosure and showings made in the drawing are merely illustrative of the principles of this invention and are not to be interpreted in a limiting sense. While the invention is shown in only a few forms, it is not just limited to the forms shown, but is susceptible to various changes and modifications without departing from the spirit thereof. The foregoing description of a preferred embodiment of the invention has been presented for the purpose of illustration and description. It is not intended to be exhaustive or to limit the invention to the precise form disclosed. Obvious modifications or variations are possible in light of the above teachings. The invention may be adapted for use in a number of environments.

The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention in accordance with the breadth of this disclosure, to which it is fairly, legally, and equitably entitled to be interpreted.

I claim:

1. A shipping envelope comprising:
   sides, a bottom, a top closure portion, and a sandwich of layers;
   the sandwich of layers comprising an outer layer, first, second, and third plastic film layers, a ceramic fiber layer, and a radiant barrier layer;
   the sandwich of layers being folded to form a folded portion comprising a fold, the fold defining the bottom of the envelope;
   the folded portion being sealed at the sides such that a receiving portion of the envelope is defined by the sides and the fold;
   the top closure portion being adapted to be folded downward over an upper portion of the folded lower portion;
   the ceramic fiber layer being positioned between the outer layer and the radiant barrier layer;
   the first plastic film layer being affixed to a side of the outer layer; and
   the second and third plastic film layers being affixed to respective sides of the radiant barrier layer.

2. The shipping envelope of claim 1, wherein at least one of the first, second, and third plastic film layers comprise non-conductive, impermeable plastic film.

3. The shipping envelope of claim 1, wherein the outer layer comprises paper.

4. The shipping envelope of claim 1, wherein the ceramic fiber layer comprises a bio soluble woven material adapted to withstand continuous temperatures up to 1260 centigrade.

5. The shipping envelope of claim 1, the sandwich of layers further comprising a mesh layer.

6. The shipping envelope of claim 5, the mesh layer being positioned adjacent to the ceramic fiber layer.

7. The shipping envelope of claim 6, the mesh layer comprising heat resistant woven mesh material.

8. The shipping envelope of claim 1, wherein the radiant barrier layer comprises metalized film.

9. The shipping envelope of claim 1, wherein the top closure portion comprises an adhesive strip.

10. A shipping envelope comprising:
    sides, a bottom, a top closure portion, and a sandwich of layers;
    the sandwich of layers comprising an outer radiant barrier layer and an inner radiant barrier layer, first, second, and third plastic film layers, and a ceramic fiber layer;
    the sandwich of layers being folded to form a folded portion comprising a fold, the fold defining the bottom of the envelope;
    the folded portion being sealed at the sides such that a receiving portion of the envelope is defined by the sides and the fold;
    the top closure portion being adapted to be folded downward over an upper portion of the folded lower portion;
    the ceramic fiber layer being positioned between the outer radiant barrier layer and inner radiant barrier layer;
    the first plastic film layer being affixed to a side of the outer radiant barrier layer; and
    the second and third plastic film layers being affixed to respective sides of the inner radiant barrier layer.

11. The shipping envelope of claim 10, wherein at least one of the first, second, and third plastic film layers comprise non-conductive, impermeable plastic film.

12. The shipping envelope of claim 10, wherein the ceramic fiber layer comprises a bio soluble woven material adapted to withstand continuous temperatures up to 1260 centigrade.

13. The shipping envelope of claim 10, the sandwich of layers further comprising a mesh layer.

14. The shipping envelope of claim 13, the mesh layer being positioned adjacent to the ceramic fiber layer.

15. The shipping envelope of claim 14, the mesh layer comprising heat resistant woven mesh material.

16. The shipping envelope of claim 10, wherein the outer and inner radiant barrier layers comprise metalized film.

17. The shipping envelope of claim 10, wherein the top closure portion comprises an adhesive strip.

* * * * *